United States Patent [19]

Matsunaga

[11] Patent Number: 5,293,240
[45] Date of Patent: Mar. 8, 1994

[54] COLOR IMAGING SYSTEM USING SOLID STATE IMAGE SENSOR WITH SIGNAL CHARGE READ CONTROLLER

[75] Inventor: Yoshiyuki Matsunaga, Kamakura, Japan

[73] Assignee: Kabushiki Kaisha Toshiba, Kawasaki, Japan

[21] Appl. No.: 851,669

[22] Filed: Mar. 16, 1992

[30] Foreign Application Priority Data

Mar. 16, 1991 [JP] Japan ................................. 3-51760
Dec. 25, 1991 [JP] Japan ................................. 3-342806

[51] Int. Cl.$^5$ ...................... H04N 3/14; H04N 5/335; H04N 9/09
[52] U.S. Cl. ..................... 348/312; 348/320; 348/265
[58] Field of Search ................. 358/50, 213.19, 213.28, 358/213.26, 213.22, 213.23, 213.29

[56] References Cited

U.S. PATENT DOCUMENTS

| 3,911,467 | 10/1975 | Levine et al. | 358/213.22 |
| 4,761,689 | 8/1988 | Takatsu et al. | 358/213.22 |
| 4,803,555 | 2/1989 | Shinbori et al. | 358/213.19 |
| 4,809,061 | 2/1989 | Suzuki | 358/50 |
| 4,831,453 | 5/1989 | Takemura | 358/213.19 |
| 4,839,734 | 6/1989 | Takemura | 358/213.26 |
| 4,866,292 | 9/1989 | Takemoto et al. | 358/213.22 |

FOREIGN PATENT DOCUMENTS

| 0225133 | 6/1987 | European Pat. Off. |
| 0286123 | 10/1988 | European Pat. Off. |
| 63-209280 | 8/1988 | Japan. |
| 2185166 | 7/1987 | United Kingdom. |

OTHER PUBLICATIONS

Patent Abstracts of Japan vol. 12, No. 498 (E-698) Dec. 24, 1988 JP-A-63 209 280 (Toshiba Corp.) Aug. 30, 1988.
Patent Abstracts of Japan vol. 4, No. 59 (E-9) May 2, 1980 & JP-A-55 030 222 (Toshiba Corp.) Mar. 4, 1980.
Patent Abstracts of Japan vol. 13, No. 413 (E-820) Sep. 12, 1989 & JP-A-11 51 891 (Fuji Photo Film Co Ltd) Jun. 14, 1989.
IEEE Transactions on Electron Devices vol. ED-32, No. Aug. 8, 1985 pp. 1511-1513 Endo et al.

*Primary Examiner*—Michael T. Razavi
*Assistant Examiner*—Wendy R. Greening
*Attorney, Agent, or Firm*—Oblon, Spivak, McClelland, Maier & Neustadt

[57] ABSTRACT

An imaging system includes a solid-state interline-transfer charge-coupled device (IT-CCD) image sensor having a matrix of rows and columns of photosensitive cells for photoelectrically producing electrical charge carriers in response to an incident light introduced thereonto. Vertical charge-transfer sections are arranged adjacent to the columns of cells, for receiving charge carriers therefrom, and for transferring these carriers toward its outputs, which are coupled with a horizontal charge-transfer section. A charge integration amount control unit is associated with the CCD image sensor such that the controller is coupled to the cell matrix and the vertical transfer sections, for controlling movement of charge carriers from the cell columns to the vertical transfer sections in such a manner that odd-numbered cell rows and even-numbered cell rows are different from each other in the effective amount of charge carriers to be read to the vertical transfer sections as effective signal charge packets.

18 Claims, 5 Drawing Sheets

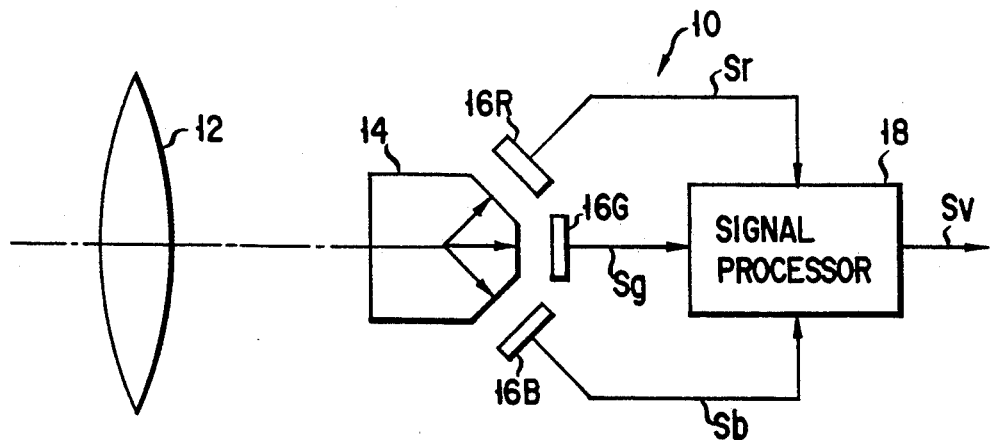
F I G. 1
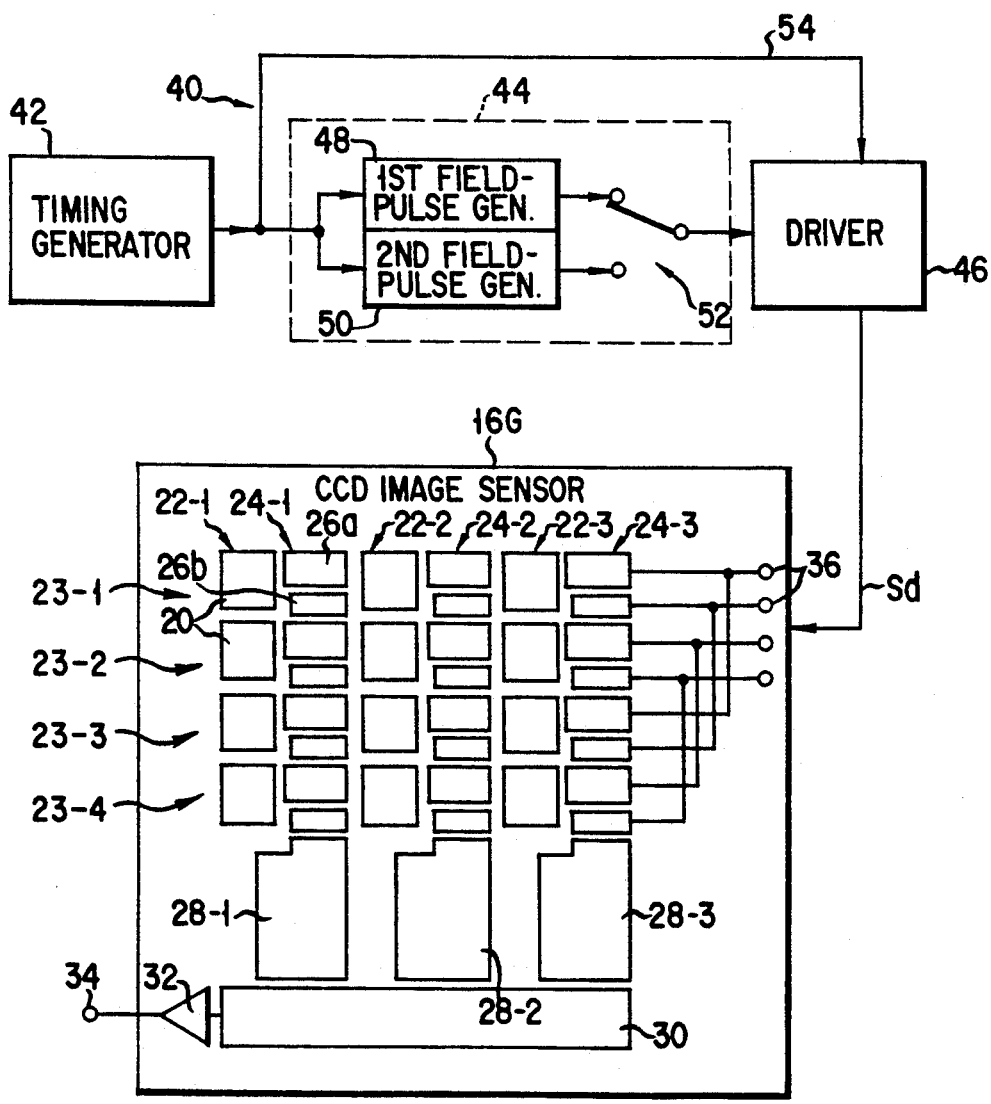
F I G. 2

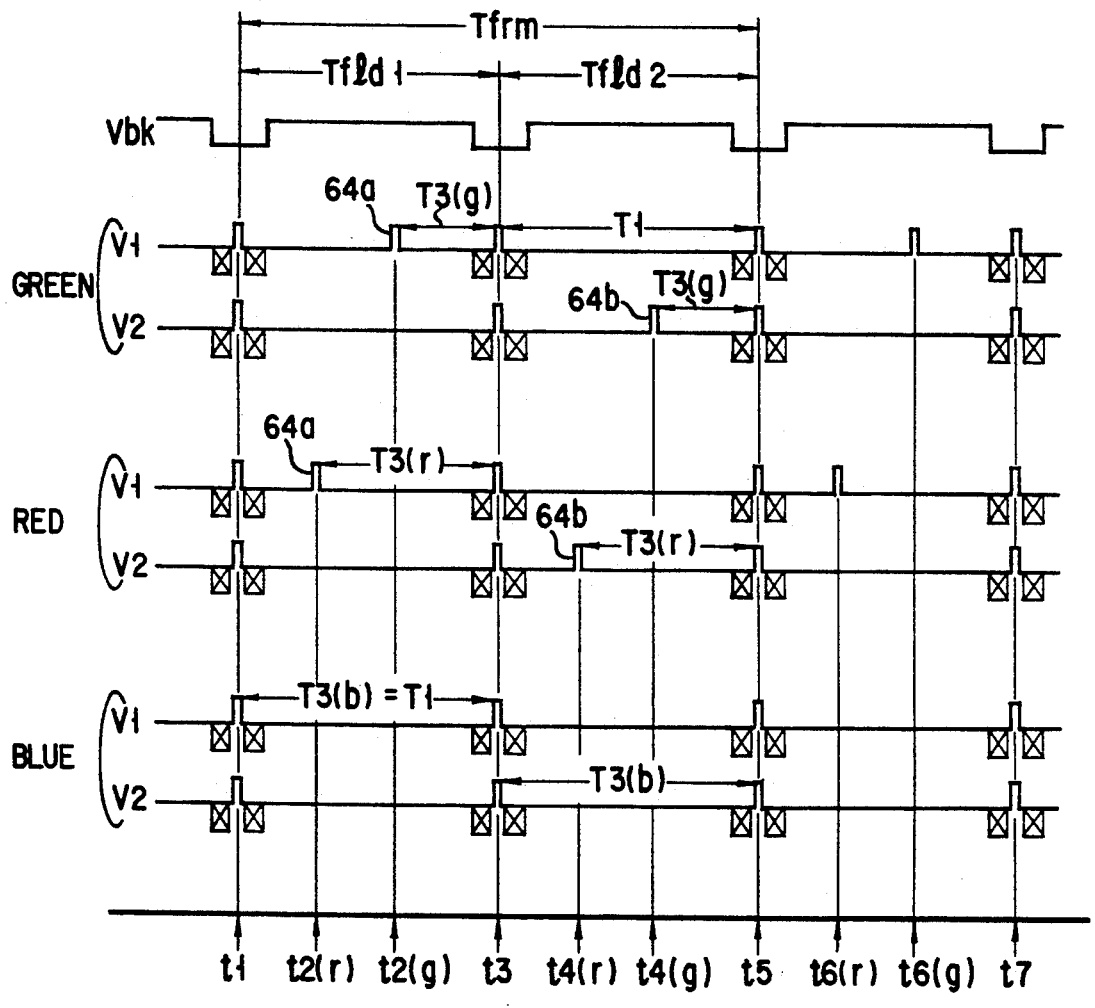
F I G. 5

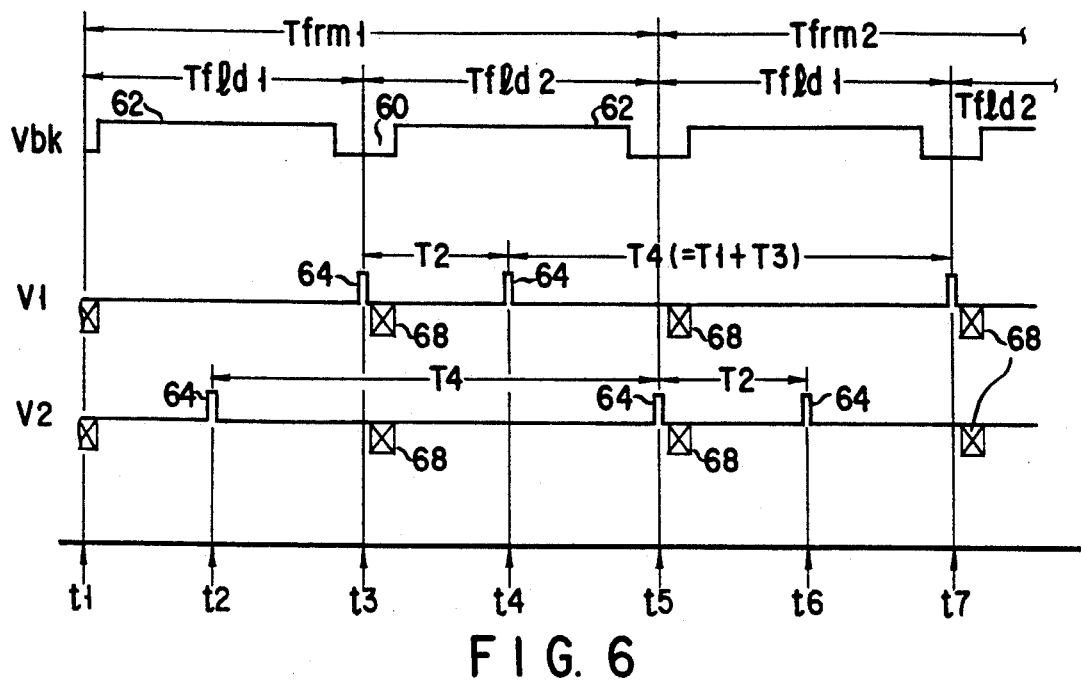
F I G. 6
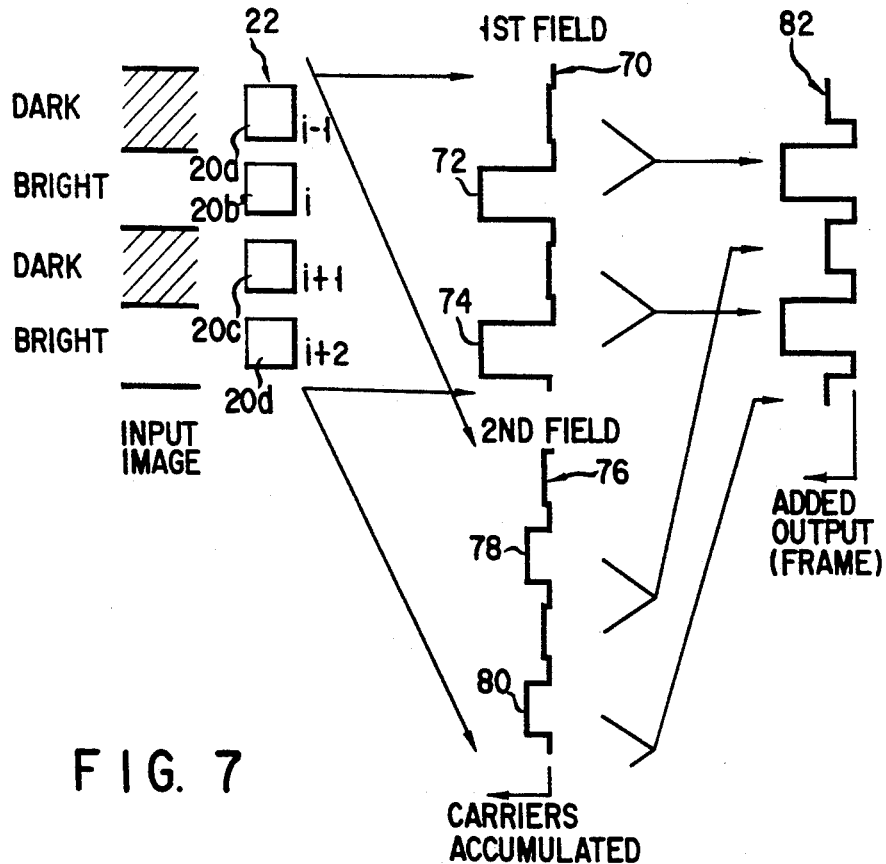
F I G. 7

COLOR IMAGING SYSTEM USING SOLID STATE IMAGE SENSOR WITH SIGNAL CHARGE READ CONTROLLER

BACKGROUND OF THE INVENTION

1. Field of the Invention

The present invention relates generally to solid-state imaging devices, and more particularly to a color image sensing system including three separate charge transfer devices packed therein.

2. Description of the Related Art

In the recent past, there have been several improvements in image sensing systems for pickup of color images. The image sensing systems may include a movie camera such as a video camera for use in the domestic or international television broadcasting stations. As the camera requires higher image quality, a pickup device employed therein becomes more critical in its photo-sensing performance. To meet such high-quality image pickup requirement, a color movie camera using three separate charge coupled device (CCD) image sensors are becoming widely used in the television broadcasting systems. The three image sensors function as a red-color sensor, a green-color sensor, and a blue-color sensor, respectively. In this regard, the camera is generally called the "three-chip color camera" in this field of technology.

Typically, an interline-transfer type image sensor or a frame-interline transfer type sensor is used as each of the CCD image sensors. The image resolution of the three-chip color movie camera is very important in the achievement of high-quality pickup images, since the resolution concerns directly to the basic pickup performance of each CCD image sensor. Until today, several techniques have been proposed in order to attain the required pickup performance for high-quality pickup images, in other words, to improve the physical and/or electrical resolution characteristic of the CCD image sensors.

As one of the resolution enhancement techniques for the CCD image sensors, it has been proposed to drive each image sensor having a matrix of charge packet storage cells (picture elements or "pixels") in such a manner that the carrier-storage (integration or accumulation) period of alternate arrays of cells in the matrix is different in time length from that of the remaining cell arrays. The technique is shown, for example, in Japanese Patent Application Disclosure (KOKAI) 63-209280 (1988). With the "field-inversion carrier read" technique disclosed therein, the carrier storage amount is reduced by forcing either the cell arrays on the even-numbered lines or those on the odd-numbered lines in the cell matrix to be shorter than ever before in the length of carrier-integration period. The vertical resolution of the CCD image sensor can thus be improved. However, this causes the photosensitivity to decrease. In other words, the prior art suffers from an inherent decrease in the sensitivity while the vertical resolution characteristic is enhanced, which may be based on the generally known "trade-off" between the sensitivity and the resolution of the CCD image sensors.

SUMMARY OF THE INVENTION

It is therefore an object of the present invention to provide a new and improved color image pickup technique which can improve the resolution characteristic without having to decrease the photosensitivity or dynamic range.

It is another object of the invention to provide a new and improved color image sensing device which is preferably used in a three-chip color pickup system and which can break through an inherent trade-off between the sensitivity and the resolution characteristic thereof.

In accordance with the above objects, the invention is drawn to a specific imaging device, which comprises a matrix of rows and columns of photosensitive cells for photoelectrically producing electrical charge packets in response to an incident light from a scene being sensed. A charge transfer section is coupled to the cell matrix, for receiving charge packets from the cell arrays, and for transferring the charge packets toward its output. A drive unit is associated with the cell matrix and the transfer section, for controlling movement of charge packets from the cell matrix to the charge transfer section so that a row of cells differs from another cell row adjacent thereto in the amount of charge carriers to be moved to the transfer section as effective signal charge packets.

The foregoing and other objects, features, and advantages of the invention will become apparent from the following more particular description of preferred embodiments of the invention, as illustrated in the accompanying drawings.

BRIEF DESCRIPTION OF THE DRAWINGS

FIG. 1 is a diagram schematically showing a three-chip color image sensing system in accordance with one preferred embodiment of the invention.

FIG. 2 is a diagram showing the internal arrangement of the main part of the system of FIG. 1.

FIG. 5 is a timing diagram showing the pulsing sequences of the electrical signals at the main components of three image sensors shown in FIG. 1.

FIG. 6 is a timing diagram showing the pulsing sequences of the electrical signals at the main components of the image sensor in accordance with a second embodiment of the invention.

FIG. 7 is a diagram showing the process to obtain a frame image output by adding a first and a second field image output with each other according to the read control scheme of the embodiment shown in FIG. 6.

DETAILED DESCRIPTION OF THE PREFERRED EMBODIMENTS

Figure 3A:
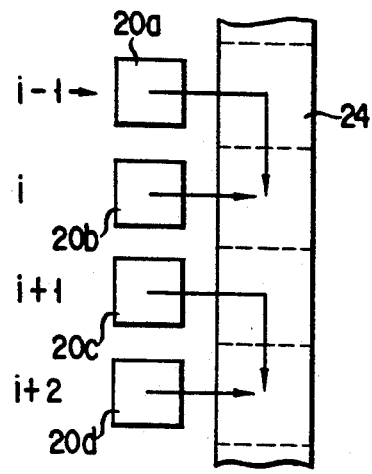
FIGS. 3A and 3B, are diagrams showing different combinations of adjacent picture elements during different field periods of the image sensor of FIG. 2.

Referring now to FIG. 1, a three-chip color image sensing system in accordance with one preferred embodiment of the invention is generally designated by the numeral 10. The system 10 includes a taking lens 12, to which an incident image light from a scene being photographed is introduced. The incident light is transmitted through lens 12 to an optical prism structure 14, which is located at the focal plane of lens 12 to face it along the optical axis. Prism 14 divides the input light into the three primary color components, i.e., a red-color (R), a green-color (G), and a blue-color (B). These color components are sent forth separately from three face edges of prism 14 respectively.

As shown in FIG. 1, three interline-transfer solid-state charge coupled device (CCD) image sensors 16R, 16G, 16B are arranged to face the three output edges of prism 14, respectively. The suffixes R, G and B stand for red, green, and blue. Where it is not necessary to distinguish among red, green, and blue, the suffixes may be dropped. Each of the output lights (red, green, blue) of prism 14 is focused on a corresponding one of the CCD image sensors 16. Red-color image sensor 16R generates an electrical red-color image signal Sr. Image sensors 16G, 16B generate a green-color image signal Sg and a red-color image signal Sb, respectively. The image signals Sr, Sg, Sb are supplied to a signal processing circuit 18, which is coupled to image sensors 16. Signal processor 18 composes image signals Sr, Sg, Sb to produce a composite color image signal Sv.

The internal arrangement of one of the three image sensors, green-color sensor 16G, for example, is illustrated in FIG. 2. The remaining two sensors 16R, 16B are similar to sensor 16G. Image sensor 16G includes an array of rows and columns of charge packet storage cells 20 (also called the "picture elements" or "pixels") in a known matrix fashion. Twelve (3×4) of these cells 20 are shown in FIG. 2 for the illustration purposes only. Each pixel may include a photodiode. The pixel matrix 20 includes a plurality of columns (vertical linear arrays) 22, only three of which are illustrated with numerals 22-1, 22-2, 22-3 being used therefor. Each cell array includes a number of pixels, only four of which are visible in FIG. 2. The rows of the cell matrix 20 are horizontal cell arrays 23-1, 23-2, 23-3, 23-4, . . . , which define the odd-numbered cell lines 23-1, 23-3 and the even-numbered cell lines 23-2, 23-4.

The vertical cell arrays 22-1, 22-2, 22-3 are associated with vertical charge-transfer sections 24-1, 24-2, 24-3, respectively. Each vertical transfer section 24$i$ ($i=1, 2, 3, \ldots$) includes a series of transfer electrodes. These electrodes consist of first subelectrodes 26$a$ and second subelectrodes 26$b$. Each cell 20 is coupled with a pair of transfer subelectrodes 26$a$, 26$b$. The outputs of vertical transfer sections 24 are connected through a corresponding number of CCD transfer buffer memory sections 28-1, 28-2, 28-3 to a horizontal CCD transfer section 30. A large number of signal charge packets (signal carriers) that are sequentially transferred by vertical transfer sections 24 are then supplied to horizontal transfer section 30 through buffer memory sections 28. Horizontal transfer section 30 has an output, which is connected via a known amplifier circuit (output amplifier) 32 to an output terminal 34 of CCD image sensor 16G. Amplifier 32 converts the output carriers of horizontal transfer section 30 to an amplified voltage signal, i.e., a pickup image signal.

Very importantly, the image sensor 16G is electrically coupled with a charge read control circuit 40, which controls the length of the charge-carrier storage (integration or accumulation) period of the cells 20. This controller 40 includes a timing generation circuit 42, a field-pulse switch circuit 44, and a drive circuit 46.

Field-pulse switcher 44 includes a first field-pulse generating circuit 48 and a second field-pulse generating circuit 50. These field-pulse generators 48, 50 are connected in parallel with each other so as to receive the output signal of timing generator 42 at the inputs thereof. Field-pulse generators 48, 50 have outputs, which are connected to driver 46 by way of a two-input switch 52. Switch 52 performs a switching operation so that the outputs of the first and second field-pulse generators 48, 50 are selectively fed to driver 46. The output of driver 46 is supplied as a four-phase pulse signal Sd to the first and second subelectrodes 26$a$, 26$b$ of the vertical transfer sections 24. The output of timing generator 42 is connected to driver 46 by a wiring line 54.

Figure 3B:
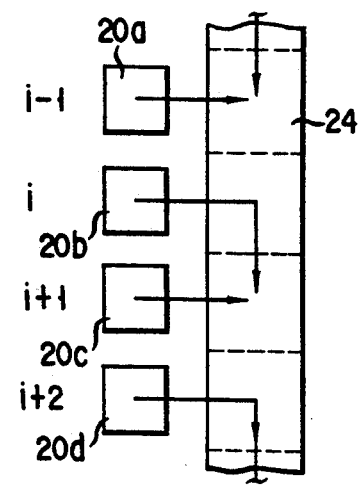

The CCD image sensor 16G is provided with four transfer signal input terminals 36, through which the four-phase pulse signal Sd is supplied to the vertical transfer sections 24. A read drive of signal charge carriers in each cell array 22 is performed by employing the "shift-reading" technique, as will be described below with reference to FIGS. 3A and 3B. Assume that one frame period consists of two subsequent field periods (shown in FIG. 4). As shown in FIG. 3A, during the first field period (Tfld1 in FIG. 4), the charge carriers stored in alternate ones of photodiode cells 20—i.e., the i-th and (i+2)th cells 20$b$, 20$d$—are driven to read to a corresponding vertical transfer section 24. At this time, these carriers are added with other carriers that are stored in the remaining adjacent cells—i.e., the (i−i)th and (i+1)th cells 20$a$, 20$c$—respectively as shown in FIG. 3A. The i-th cell 20$b$ is combined with (i−1)th cell 20$a$, and (i+2)th cell 20$d$ is combined with (i+1)th cell 20$c$. During the second field period (Tfld2 in FIG. 4), the charge carrier addition is "shifted" among the adjacent cells as follows: A charge packet read from i-th cell 20$b$ is now added together with a charge packet from (i+1)th cell 20$b$, rather than with that of (i−1)th cell 20$a$, as shown in FIG. 3B. At this time, (i−1)th cell 20$a$ is combined with a (i−2)th cell, which is not visible in FIG. 3B. Such a "shift-adding" technique, itself, is known among those skilled in the imaging device art. The charge carriers introduced into each vertical transfer section 24 will be sequentially transferred as effective signal charge packets toward the horizontal transfer section 30 of FIG. 2 in response to the four-phase pulse signal Sd.

Figure 4:
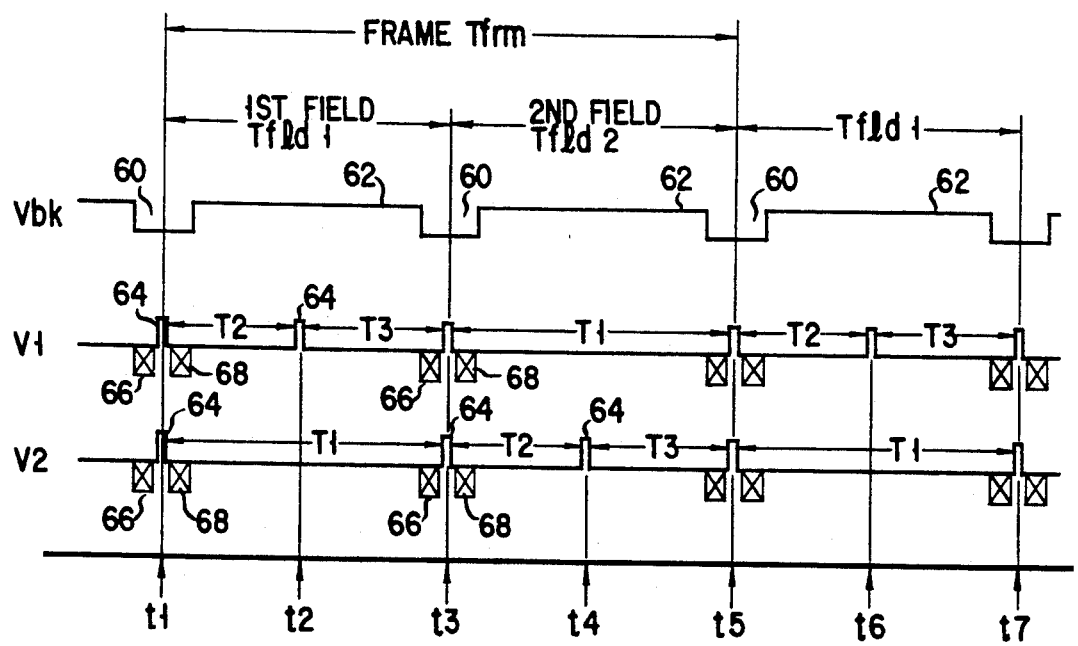
FIG. 4 is a timing diagram showing the pulsing sequence of the electrical signals generated at the main components of the image sensor of FIG. 2.

A specific carrier read control technique to be employed in the above embodiment will now be described with reference to FIG. 4. In FIG. 4, each frame period Tfrm includes a first field period (odd-numbered field period) Tfld1 and a second field period (even-numbered field period) Tfld2. A vertical blanking signal Vbk includes a combination of first and second pulse components 60, 62, which are alternately generated as shown in FIG. 4. One pulse component 60 defines the length of the vertical blanking period of the CCD image sensor 16G, whereas pulse component 62 defines the effective image pickup period thereof. The same goes with the CCD image sensors 16R, 16B.

The charge-integration time controller 40 of FIG. 2 provides first and second control pulse signals V1, V2 so as to exhibit the pulsing sequence waveforms shown in FIG. 4. The first signal V1 controls the signal charge packet read operation in the odd-numbered cell lines 23-1, 23-3, . . . of the cell matrix 20 of FIG. 2. The second signal V2 controls the signal charge packet read operation in the even-numbered cell lines 23-2, 23-4 of the cell matrix. Signals V1, V2 include certain pulse components 64, which are the read pulse signals that cause signal charge packets to move or transfer from cells 20 to corresponding ones of the vertical transfer sections 24. Signals V1, V2 also include high-frequency pulse components 66, each of which forces the charge packets to drain from the corresponding vertical transfer sections 24 to buffer sections 28 associated therewith. Signals V1, V2 further include high-frequency pulse components 68, which are charge transfer control signals to be supplied to buffers 28.

The charge packet read control pulses 64 are specifically arranged in the control signals V1, V2 of FIG. 4 as follows. Regarding signal V1, pulses 64 appear at time points t1, t3, t5, t7, each of which defines the changeover between the first and second field periods Tfld1, Tfld2, and also at a "midtime" point t2, t6 of each of the first field periods Tfld1. Signal V2 differs from signal V1 in that pulses 64 are generated at midtime points (only t4 is visible in FIG. 4) of the second field periods Tfld2, rather than at the midpoints t2, t6 of the first field periods Tfld1. Thus, pulses 64 of signal V2 appear at time points t1, t3, t4, t5, t7 as shown in FIG. 4. With such control signals V1, V2, a charge packet read operation of the image sensor 16G will be effected as will be explained below.

As shown in FIG. 4, during the first field period Tfld1, a number of charge carriers, which have been photoelectrically produced and stored (accumulated or integrated) in the cells 20 of the odd-numbered cell lines 23-1, 23-3 during a shortened period T2 defined between time points t1, t2, are read out to vertical transfer sections 24 before the appearance of a drain-control pulse 66 in the first control signal V1 just before time t3. Accordingly, these charge carriers cannot be a part of the effective signal charge packets; they are drained as unnecessary charge carriers to be wasted. On the other hand, the second control signal V2 does not have any pulse 64 between time points t1, t3 during the first field period Tfld1. This permits all the integrated charge carriers, which have been stored in the even-numbered cell lines 23-2, 23-4 during a period T1 (=T2+T3), to be read out as effective signal charge packets. The above read operation may be summarized as follows: The charge storage (integration) period for the odd-numbered cell lines 23-1, 23-3 are shortened to T3 (=T1−T2) during every first field period Tfld1, while the charge storage period for the even-numbered cell lines 23-2, 23-4 are T1, which is substantially equal to the full length of first field period Tfld1.

The reverse goes with the second field period Tfld2. The charge storage period for the odd-numbered cell lines 23-1, 23-3 is lengthened or amplified to be equal to the period T1; the charge storage period for the even-numbered cell lines 23-2, 23-4 is shortened to T2 due to the generation of a read control pulse 64 at midtime point t4. This occurs since any charge carriers to be photoelectrically produced in cell lines 23-2, 23-4 during the period T2 defined between t3 and t4 are forced to drain outwardly as the unnecessary charge packets in the same manner as mentioned previously. The different charge storage period control scheme between the first and second field periods Tfld1, Tfld2 within one frame period Tfrm will be effected similarly with respect to subsequent frame periods.

With such an arrangement, the vertical resolution of the image sensor can be improved by alternately changing the effective charge storage (integration or accumulation) period of the odd-numbered cell lines 23-1, 23-3 and that of the odd-numbered cell lines 23-2, 23-4 between the first and second field periods Tfld1, Tfld2 within each frame period Tfrm. Note that the preparation of the control pulse signals V1, V2 of FIG. 4 may be easily carried out by selectively supplying the driver 46 of FIG. 2 with the output pulse signals of the first and second field pulse generators 48, 50 by way of switch 52 under the control of timing generator 42, without making use of any extra circuitry therefor.

While the above "alternate charge storage time control" technique for achievement of high resolution may be simply applied to each of the three CCD image sensors 16R, 16G, 16B shown in FIG. 1, a problem will arise. If image sensors 16 are driven equally under the "alternate charge storage time control" scheme, since the charge carriers obtained during the period T2 run to waste, the sensitivity of the color composite image signal Sv will decrease as the result of a trade-off with the high resolution achievement. Fortunately, the present invention can also overcome such a problem successfully to optimize the higher resolution achievement and the lower sensitivity suppression, by additionally employing a specific drive technique as will be described below.

According to an embodiment shown in FIG. 5, the compensation for the decrease in the photosensitivity can be achieved by specifically arranging the signals V1, V2 so that the shortened charge-storage (integration or accumulation) period T3 of FIG. 4 is differently arranged with respect to the three CCD image sensors 16R, 16G, 16B. More specifically, regarding the green-color image sensor 16G, signal V1 is arranged so that the midtime of appearance of an "intermediate" pulse 64a during the first field period Tfld1 is either similar to t2 of FIG. 4 or slightly shifted to a time t2(g) as shown in FIG. 5, thereby causing pulse 64a to be delayed so that the length of period T3 of FIG. 4 is restricted to a shortened period T3(g). Similarly, signal V2 is arranged so that the midtime of appearance of an intermediate pulse 64b during the second field period Tfld2 is equal to t4 of FIG. 4 or slightly delayed to a time t4(g) as shown in FIG. 5, thereby obtaining a shortened period T3(g). With such an arrangement, the charge storage period T3 of sensor 16G is equal or slightly increased.

Regarding the red-color image sensor 16R, the signal V1 is arranged so that the midtime of appearance of pulse 64a during first field period Tfld1 is accelerated by time-shift to a time t2(r) as shown in FIG. 5, thereby causing the length of charge-integration period T3 to increase to a period T3(r) of FIG. 5. Signal V2 is similarly arranged so that the midtime of appearance of pulse 64b during second field period Tfld2 is accelerated to a time t4(r), thereby obtaining a longer period T3(r) than period T3 of FIG. 4. Concerning blue-color image sensor 16B, as is apparent from FIG. 5, first and second signals V1, V2 are arranged to contain midtime point (t2, t4, t6) of each field period Tfld1, Tfld2. In other words, sensor 16B does not employ the "alternate charge storage time control" technique; it is allowed to operate ordinarily while sensors 16R, 16G operate uniquely under the "alternate charge storage time control" schemes, which are differently modified from each other as described above.

Using the different charge-storage period settings results in that, while the "alternate charge storage time control" technique using the shortened charge storage period T3 of FIG. 4 is selectively applied more significantly to a specific one —i.e., the green-color image sensor 16G of the three CCD image sensors 16 that determines the total resolution characteristic of the image sensing system 10, the technique is not applied to another one of these image sensors 16 which does not essentially affect the total resolution characteristic of system 10, i.e., the blue-color sensor 16B. Regarding the remaining image sensor, i.e., the red-color image sensor 16R that affects the image resolution intermediately, the technique is applied thereto by slightly "weakening" the concept of shortening the charge-storage period. In other words, the red-color charge storage period T3(r) is specifically set to satisfy the following relationship: T3(g)<T3(r)<T3(b), where T3(b)=T1. This may be easily accomplished by modifying the internal circuit design of the timing generator 42 of FIG. 1 with respect to every one of three image sensors 16R, 16G, 16B.

With such an arrangement, since the resultant resolution of a final color composite image signal Sv obtained from the three output image signals Sr, Sg, Sb of sensors 16 is determined mainly by the output signal Sg of green-color sensor 16G having the maximized resolution, and also by the output signal Sr of red-color sensor 16R having intermediately improved resolution. The photosensitivity of image signal Sv is determined mainly by the output Sb of blue-color sensor 16B having the maximized sensitivity, and additionally by the output Sr of red-color sensor 16R having intermediately improved sensitivity. Accordingly, the image signal Sv finally comes to exhibit the improved sensitivity without having to decrease the resolution characteristic.

Turning now to FIG. 6, there is shown another embodiment of the invention. The characteristic feature of this embodiment is that, in order to provide the "shortened charge storage period" feature, the charge carriers photoelectrically produced during the period T2 of FIG. 4 are not wasted as unnecessary carriers unlike the embodiments shown in FIGS. 4 and 5; alternatively, these carriers are forced to be read out as a part of effective signal charge packets during a next field period, thereby to further improve the photosensitivity. The time scale of the pulsing sequence diagram shown in FIG. 6 is same as that of FIG. 4, and similar reference symbols are used to designate similar parts. Note that pulses 68 of FIG. 6 serve to cause charge carriers to move from the vertical transfer sections 24 to buffers 28.

As shown in FIG. 6, the first and second control pulse signals V1, V2 specifically limit the generation of read pulses 64 and of high-frequency pulses 68 for causing carriers to drain from the vertical transfer sections 24 of FIG. 2 to buffer sections 28 as follows. Regarding signal V1, the generation of read pulse 64 is prohibited at the end of each frame period Tfrm (t5 for Tfrm1). Similarly, regarding signal V2, the generation of read pulse 64 is prohibited at the end (t3, t7) of the first field period Tfld1 in each of the frame periods Tfrm1, Tfrm2. In addition, signals V1, V2 permit high-frequency pulses 68 to appear after the termination time points t3, t5, t7 of each field period Tfld.

With the modified control pulse signals V1, V2 being employed to one of image sensors 16, a charge carrier read operation is effected as follows. With respect to the odd-numbered cell lines 23-1, 23-3 to which signal V1 is applied, the charge carriers that are integrated in the pixels 20 of these cell lines 23-1, 23-3 during period T2, which is defined between time points t3, t4 and included in the second field period Tfld2 of first frame period Tfrm1 of FIG. 6, are not read out during the same period Tfld1; they are read out during a next field period, i.e., the first field period Tfld1 of the second frame period Tfrm2 of FIG. 6, as a part of effective signal charge packets. On the other hand, regarding the even-numbered cell lines 23-2, 23-4 being applied with signal V2, the charge carriers stored in the cells of the even-numbered cell ines 23-2, 23-4 during the lengthened period T4 of FIG. 6, which is defined between the time points t2 and t5 to "bridge" the first and second field periods Tfld1, Tfld2 within first frame period Tfrm1, are output as a part of effective signal charge packets during a first field period Tfld1 of a next frame period Tfrm2. Subsequently, the charge carriers that are stored in the odd-numbered cell lines 23-1, 23-3 during the long period T4 (=T1+T3) of signal V1 are output during the next field period Tfld2; those carriers stored in the even-numbered cell lines 23-2, 23-4 during the shortened period T2 of signal V2 are output during a next field period. By alternately changing the time length of the charge storage periods between odd-numbered cell lines 23-1, 23-3 and even-numbered cell lines 23-2, 23-4 as described above, it becomes possible to generate a difference in the effective sensitivity between odd-numbered cell lines 23-1, 23-3 and even-numbered cell lines 23-2, 23-4 during each field period Tfld. This can improve the modulation transfer function (MTF) characteristic in the spatial frequency region near the Nyquist limit (the limit level of resolution obtained under a certain pixel pitch being used) of CCD image sensor 16. Improving the MTF characteristic will contribute to the resolution enhancement without decreasing the sensitivity characteristic of the image sensor.

The reason why the above technical advantages can be obtained is as follows. See a model shown in FIG. 7. This model assumes that an incident light having an alternate pattern of bright portions and dark portions (hatched) is introduced onto cells 20a-20d of a certain cell array 22. Upon reception of such light pattern, the read output of cells 20a-20d during the first field period Tfld1 is represented by a waveform 70, wherein the i-th and (i+2)th cells 20b, 20d receiving the bright light components are higher in sensitivity so that pulsed waveforms 72, 74 appear in the outputs of cells 20b, 20d, while the (i−1)th and (i+1)th cells 20a, 20c receiving the dark components remain lower in sensitivity. The carrier-read output of these cells 20 during the second field period Tfld2 is represented by a waveform 76, wherein the carrier outputs of high-sensitivity cells 20b, 20d are kept at lower levels as designated by the numerals 78, 80. The first and second field outputs are then added together, in accordance with the known shift-adding technique, with the outputs of adjacent cells being alternately shifted in combination during each of the first and second field periods, thereby to obtain a resultant frame image output 82, which electrically emphasizes the bright/dark pattern of incident light correspondingly.

Figure 8:
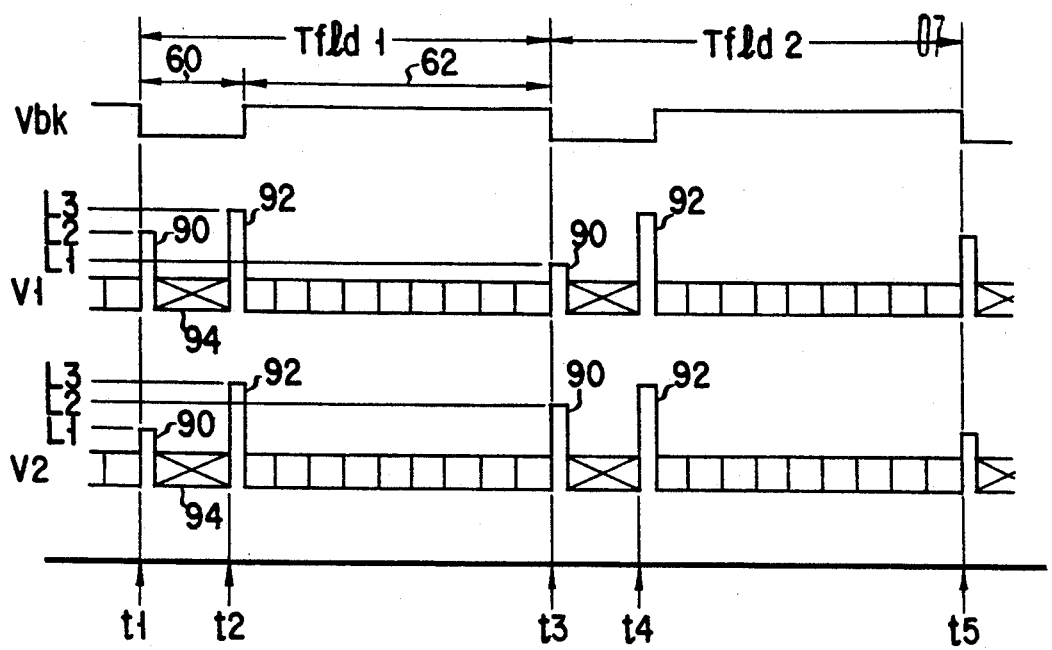
FIG. 8 is a timing diagram showing the pulsing sequences of the electrical signals at the main components of the image sensor in accordance with a third embodiment of the invention.

A further embodiment of the invention is shown in FIG. 8. The characteristic feature of this embodiment is that an interline-transfer image sensor having an enhanced dynamic range is used and that the resolution characteristic is improved by modifying a signal-carrier drain section thereof. A read drive method for enhancing the dynamic range, itself, is known among those skilled in the art, and is described in IEEE, vol. ED-32, No. 8, 1985, p. 1511.

With the embodiment shown in FIG. 8, the carrier-read drive pulse signal for the odd-numbered cell lines 23-1, 23-3 and that for the even-numbered cell lines 23-2, 23-4 are made different from each other. Drive signal V1 to be applied to the odd-numbered cell lines and drive signal V2 applied to the even-numbered cell lines are (1) arranged differently in potential level of a slice-pulse (read pulse) component by employing three different potential levels, i.e., a low-level L1, a midlevel L2, and a high-level L3, and (2) different in pulse level between the field periods Tfld1, Tfld2. The potential level of each read pulse 90 determines the actual read amount of excess signal charge carriers.

More specifically, the signal V1 has a pulse 90 having the midlevel L2 (8 volts, for example) at the beginning (t1) of the first field period Tfld1. At changeover time t2 between the vertical blanking period 60 and the effective period 62, signal V1 has a pulse 92 of the high-level L3 (10 volts, for example). This pulse is a specific slice pulse component, which appears to follow a high-speed pulse 94 causing signal charge carriers to be transferred from the vertical transfer sections 24 toward horizontal transfer section 30. In this sense, pulse 92 is called the "horizontal transfer pulse." Regarding signal V2, pulse 90 appears at time t1 to have the low-level L1 (5 volts, for example), and pulse 92 appears at time t2 to have the high-level L3. Thereafter, during the second field period Tfld2, read pulse 90 of signal V1 drops from midlevel L2 down to low level L1, whereas read pulse 90 of signal V2 rises from level L1 to L2. Note that horizontal transfer pulses 92 appearing at time points t2, t4 in each signal V1, V2 are held at high-level potential L3 throughout the aforesaid potential changes of read pulses 90.

Figure 9:
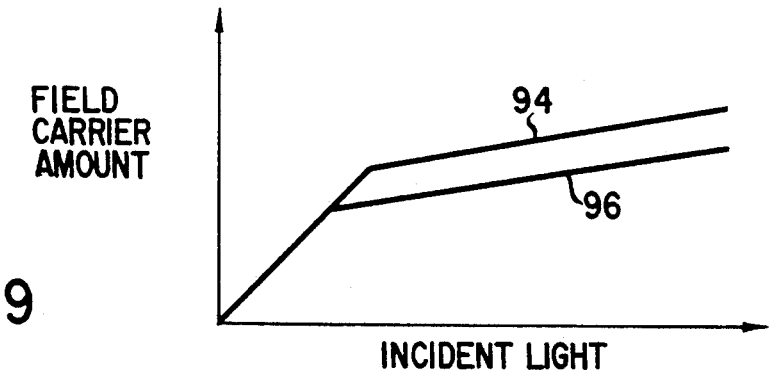
FIG. 9 is a graph showing the field output characteristic obtained when the drive signals of FIG. 8 are employed.
Figure 10:
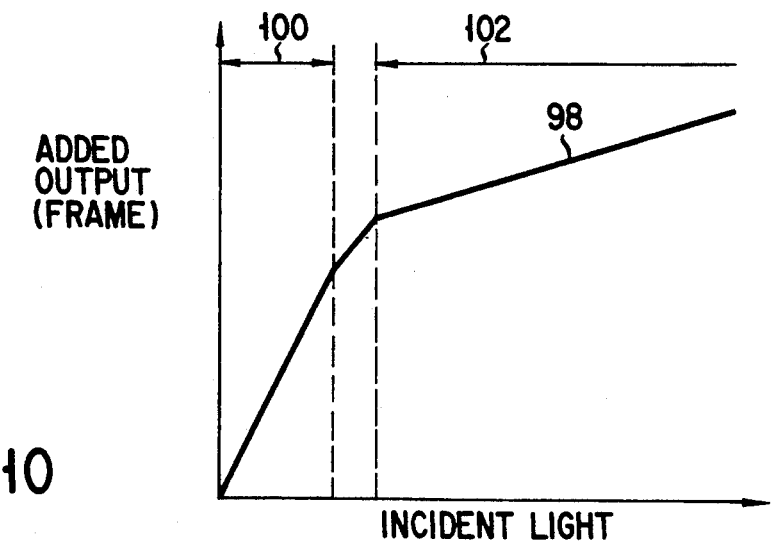
FIG. 10 is a graph showing the input/output characteristic of a frame image obtained by adding together the field outputs of FIG. 9.

By employing the drive signals V1, V2, the amount of signal charge carriers read from a certain photodiode cell or pixel toward a corresponding vertical transfer section 24 becomes different between the first and second field periods Tfld1, Tfld2 as shown by folded lines 94, 96 in FIG. 9. FIG. 9 shows carrier-amount vs. incident-light characteristics for the pixels, wherein line 94 represents a signal-carrier light slope of those pixels of the even-numbered cell lines during first field period Tfld1, whereas line 96 represents that of those pixels of the odd-numbered cell lines during the same field period Tfld1. A change in signal-carrier amount obtained from the odd-numbered cell arrays during the second field period Tfld2 is similar to that represented by line 94; a change of signal-carrier amount obtained from the even-numbered cell arrays during the second field period Tfld2 is similar to that represented by line 96. A frame-output vs. light characteristic, which is obtained by shift-adding the first and second field carrier outputs 94, 96 shown in FIG. 9 in a manner as explained with reference to FIG. 7, is shown by a line 98 in a graph of FIG. 10. In FIG. 10, while the combination or "pairing" of the adjacent cell outputs to be added together is different between the first and second field periods Tfld1, Tfld2 as shown in FIG. 7, the frame input/output characteristic is kept unchanged throughout these field periods.

With this embodiment, the improvement in resolution is accomplished as follows. In a case where an incident light is relatively lower in intensity (i.e., in the region 100 shown in FIG. 10), no excess charge carriers are produced in both the odd-numbered cell lines 23-1, 23-3 and the even-numbered cell lines 23-2, 23-4. Therefore, any charge carriers are output to the vertical transfer sections 24. This results in that the amount of the signal charge carriers added together is simply proportional to the intensity of incident light. When two adjacent pixels are shift-added with each other, the resulting added output is constant. This means that all the charge carriers that are photoelectrically produced and integrated in the cells 20 are read out as the effective signal charge packets; therefore, the loss in the sensitivity is substantially zero.

On the other hand, in a case where the incident light is relatively higher in intensity (i.e., in the region 102 of FIG. 10), with the aforesaid "read-pulse potential differing" feature, the read carrier amount of the even-numbered cell lines is greater than (i.e., higher in sensitivity) that of the odd-numbered cell lines during the first field period Tfld1 in each frame period Tfrm; during the second field period Tfld2, the above relationship is reversed between the odd-numbered cell lines and the even-numbered cell lines. Accordingly, when the first and second field outputs are added together in a manner as has been described with reference to FIG. 7, the first field output, wherein the cell outputs of i-th and (i+2)th cells 20b, 20d in each array are greater in sensitivity than those of the (i−1)th and (i+1)th- cells 20a, 20c, becomes greater than the second field output wherein the reverse relationship goes between the i-th and (i+1)th cell outputs and the (i−1)th and (i+2)th cell outputs. (As is apparent from viewing the graph of FIG. 10, the gradient of the added output in region 102 is more moderate than that in region 100.) As a result, the frame output obtained by addition of these field outputs can exhibit excellent resolution in a similar manner as shown by waveform 82 in FIG. 7.

The above arrangement makes the image sensor capable of performing a specific carrier-read drive operation that causes only the excess charge carriers to be wasted partially in a restricted region of greater in the incident light intensity, while the waste of signal charge carriers is minimized in the region that is less in the incident light intensity. It is thus possible to maximize the resolution characteristic in bright image region and also to minimize the decrease in the photosensitivity, with the dynamic range of the image sensor being kept enhanced.

The present invention is not limited to the above-described specific embodiments and may be practiced or embodied in still other ways without departing from the spirit or essential character thereof.

What is claimed is:

1. An imaging system comprising:
    an array of rows and columns of photosensitive cells for photoelectrically producing charge carriers in response to an incident light;
    a charge transfer section coupled to said array, said charge transfer section including first transfer means coupled to the columns of photosensitive cells for allowing the charge carriers to be transferred substantially simultaneously form said columns to said first transfer means while readout charge carriers of respective neighboring cells in each column are added to the transferred charge carriers, and second transfer means coupled to said first transfer means for sending forth the charge carriers sent from said first transfer means; and
    drive means associated with said array and said first transfer means, for controlling movement of charge carriers from said columns to said charge transfer section during a frame period including first and second field periods so that adjacent ones of the rows of said array differ from each other in amount of charge carriers to be supplied to said first transfer means as effective signal charge carriers and have first and second charge carrier integration time lengths during the first field period, and that the adjacent rows are reversed in carrier integration time length during the second field period, said drive means alternately changing the first and second charge carrier integration time lengths for each other between the first and second field periods.

2. A system according to claim 1, wherein said drive means causes said adjacent ones of said rows to differ from each other in length of charge carrier integration time for storing the effective signal charge carriers.

3. A system according to claim 2, wherein said drive means causes each of said adjacent ones of said rows to differ in an amount of charge carriers to be supplied to said first transfer means between the first field period and the second field period.

4. A system according to claim 3, wherein said drive means causes each of said adjacent ones of said rows to alternately have a first charge carrier-storage time and a second charge carrier-storage time during the first field period and the second field period, said first charge carrier-storage time being different in length from said second charge carrier-storage time.

5. A system according to claim 4, wherein said drive means causes, when one of said adjacent ones of said rows has the first charge carrier-storage time during the first field period, the other of the adjacent rows to have the second charge carrier-storage time during the first field period.

6. A system according to claim 5, wherein said drive means causes said adjacent ones of said rows to differ from each other in a timing of charge carrier movement to said first transfer section in each of the first and second field periods.

7. A system according to claim 6, wherein said drive means prevents one of said adjacent rows from supplying charge carriers integrated therein to said first transfer section while the other of said adjacent rows begins to supply charge carriers accumulated therein to said first transfer means, at a time point defined between the first and second field periods.

8. A system according to claim 7, wherein said drive means changes said one and said the other of said adjacent rows alternately at two ones of a series of time points defining alternate occurrence of said first and second field periods.

9. A system according to claim 8, further comprising:
adder means of adding charge carriers read from the ones of the rows of said array during the first field period of those read therefrom during the second field period, and for generating an added signal of charge carriers as an image pickup signal.

10. A method for driving a plurality of imaging devices each including a matrix of photosensitive cells including a plurality of linear cell array sections for photoelectrically producing charge carriers in response to an incident light, and a transfer section coupled to said matrix, said method comprising the steps of:
causing said cell array sections to transfer charge carriers sorted or integrated therein toward the transfer section substantially simultaneously while carriers of respective neighboring cells are added to the transferred charge carriers in a corresponding cell array section;
controlling movement of charge carriers from said cell array sections to said transfer section so that a cell array section differs from another cell array section adjacent thereto in the amount of charge carriers to be moved to said transfer section as effective signal charge carriers and to have first and second charge carrier integration time lengths during a first field period, and that the adjacent rows are reversed in charge carrier integration time length during a second field period in at least one of the imaging devices; and
alternately changing the first and second integration time lengths for each other between the first and second field periods.

11. A method according to claim 10, wherein said step of controlling movement of charge carriers comprises the sub-steps of:
supplying a cell array section with a first electrical signal defining a first effective charge carrier-integration period during either one of the first field period and the second field period; and substantially simultaneously,
supplying another cell array section adjacent to said cell array section with a second electrical signal defining a second effective charge carrier-integration period during said one of the first and second field periods included in said frame period.

12. A method according to claim 11, wherein said sub-step of supplying the first signal and said sub-step of supplying the second signal are alternately replaced with each other with respect to said cell array section and said another cell array section between the first and second field periods.

13. A method according to claim 12, wherein said step of controlling movement of charge carriers further comprises the sub-step of:
causing a certain amount of charge carriers corresponding to a difference between initially integrated charge carriers and the effective signal charge carriers in each of said cell array sections and said another cell array section during one of the first and second field periods to be readout during the other of the first and second field periods.

14. A method according to claim 12, wherein an effective amount of charge carriers is made different among the plurality of imaging devices.

15. A method according to claim 10, wherein said step of controlling movement of charge carriers comprises the sub-steps of:
supplying a cell array section with a first electrical signal having a first pulse and a second pulse at the beginning and the end of a blanking period during one of the first field period and the second field period; and substantially simultaneously,
supplying another cell array section adjacent to said cell array section with a second electrical signal having pulses corresponding to the first and second pulses at the beginning and the end of a blanking period during said one of the first and second field periods, said first pulse of the first signal being potentially different from the corresponding one of the second signal.

16. A method according to claim 15, wherein said first pulse of each of the first and second signals has different potential levels at different time points between the first and second field periods, while the second pulses of said first and second signals are kept at a constant potential level.

17. A method according to claim 16, wherein, when the first pulse of either one of said first and second signals is potentially greater than that of the other thereof during the first field period, said first pulse of said either one of said first and second signals is forced to be potentially less than that of said the other during the second field period that follows said first field period.

18. A method according to claim 17, wherein the changing of potential of said first pulse is alternately performed during a series of frame periods of each of which includes the first and second field periods.

* * * * *